US008665060B2

(12) United States Patent
Wu et al.

(10) Patent No.: US 8,665,060 B2
(45) Date of Patent: Mar. 4, 2014

(54) METHOD OF CONTROLLING STORAGE DEVICE AND STORAGE DEVICE THEREOF

(75) Inventors: Yang-Fei Wu, Taipei (TW); Ming-Hong Hsiao, Taipei (TW)

(73) Assignee: Transcend Information, Inc., NeiHu Dist, Taipei (TW)

( * ) Notice: Subject to any disclaimer, the term of this patent is extended or adjusted under 35 U.S.C. 154(b) by 200 days.

(21) Appl. No.: 13/367,340

(22) Filed: Feb. 6, 2012

(65) Prior Publication Data

US 2013/0200993 A1    Aug. 8, 2013

(51) Int. Cl.
*G05B 19/02* (2006.01)
(52) U.S. Cl.
USPC ........................................ 340/4.31

(58) Field of Classification Search
USPC .................... 340/4.31, 4.42, 5.1, 3.1
See application file for complete search history.

(56) References Cited

U.S. PATENT DOCUMENTS

| | | | |
|---|---|---|---|
| 2007/0273583 A1* | 11/2007 | Rosenberg | 342/367 |
| 2009/0085870 A1* | 4/2009 | Mosko | 345/158 |
| 2010/0211652 A1* | 8/2010 | Hong | 709/217 |

* cited by examiner

*Primary Examiner* — Vernal Brown
(74) *Attorney, Agent, or Firm* — Winston Hsu; Scott Margo

(57) ABSTRACT

A storage device is capable of switching its wireless sharing mode while sensing occurrence of a flip-over on itself. With the aid of the storage device, a user may easily and intuitively activate an operation of sharing information with other external storage devices or determine a degree of sharing the information.

22 Claims, 5 Drawing Sheets

| Wireless sharing modes | Activated |
|---|---|
| Enable/Disable link | No |
| Increase/Decrease upper-bound number | No |
| Raise/Lower priority | Yes |
| Broaden/Narrow Bandwidth | No |

FIG. 3

METHOD OF CONTROLLING STORAGE DEVICE AND STORAGE DEVICE THEREOF

BACKGROUND

1. Technical Field

The present invention discloses a method of controlling a storage device and the storage device thereof, and more particularly, to a method of controlling a storage device to determine a wireless-sharing mode of the storage device according to whether there is a flip-over on the storage device and the storage device utilizing the method.

2. Description of the Conventional Art

For a conventional storage device, interaction between its user and itself are primarily point-to-point. However, there are more new types of interactions between a storage device and its user, such as one-to-multiple wireless sharing for sharing data of the storage device to other storage devices. It introduces much convenience between different users in retrieving information.

However, while using the one-to-multiple wireless sharing on the conventional storage device, if there are more people to share data from the conventional storage device, the performance of the one-to-multiple wireless sharing will be decreased further in a significant manner; when security issues are taken, a password or authentication is required for each attendee every time when the one-to-multiple wireless sharing is initiated; besides, when the user intends to activate the one-to-multiple wireless sharing on the storage device, he or she may be required to initiate a plurality of complex operations on the conventional storage device. Those factors mentioned above would bring much inconvenience for the user of the storage device and other attendees intending to share information with the user.

SUMMARY

The claimed invention discloses a first method of controlling a storage device. The first method comprises generating a predetermined trigger signal while the storage device is flipped over; and switching the storage device between a first wireless sharing mode and a second wireless sharing mode in response to the predetermined trigger signal The claimed invention discloses a second method of controlling a storage device. The third method comprises generating a predetermined trigger signal for indicating a faced-up/down status of the storage device; and switching the storage device to a first wireless sharing mode or a second wireless sharing mode according to the predetermined trigger signal.

The claimed invention discloses a first storage device. The first storage device comprises a sensor, a memory, a processor, and an antenna. The sensor is utilized for generating a predetermined trigger signal while sensing that the storage device is flipped over. The memory is utilized for storing a first wireless sharing mode and a second wireless sharing mode. The processor is utilized for switching the storage device from the first wireless sharing mode to the second wireless sharing mode in response to the predetermined trigger signal. The antenna is utilized for transmitting information of the storage device in a wireless manner.

The claimed invention discloses a second storage device. The second storage device comprises a sensor, a memory, a processor, and an antenna. The sensor is utilized for generating a predetermined trigger signal for indicating a faced-up/down status of the storage device. The memory is utilized for storing a first wireless sharing mode and a second wireless sharing mode. The processor is utilized for switching the storage device to a first wireless sharing mode or a second wireless sharing mode according to the predetermined trigger signal. The antenna is utilized for transmitting information of the storage device in a wireless manner.

These and other objectives of the present invention will no doubt become obvious to those of ordinary skill in the art after reading the following detailed description of the preferred embodiment that is illustrated in the how a user of a storage device of the present invention can activate a wireless sharing mode that he or she wants by merely one flip-over on the storage various figures and drawings.

BRIEF DESCRIPTION OF THE DRAWINGS

FIG. 3 illustrates a flowchart of a method of controlling a storage device to switch its wireless sharing mode according to the embodiments of the present invention.

DETAILED DESCRIPTION

The primary purpose of the present invention is to disclose a method of controlling a storage device for determining a wireless sharing mode in an intuitive manner so that a user of the storage device can conveniently activate a specific wireless sharing mode on the storage device at anytime he or she wants.

Figure 1:
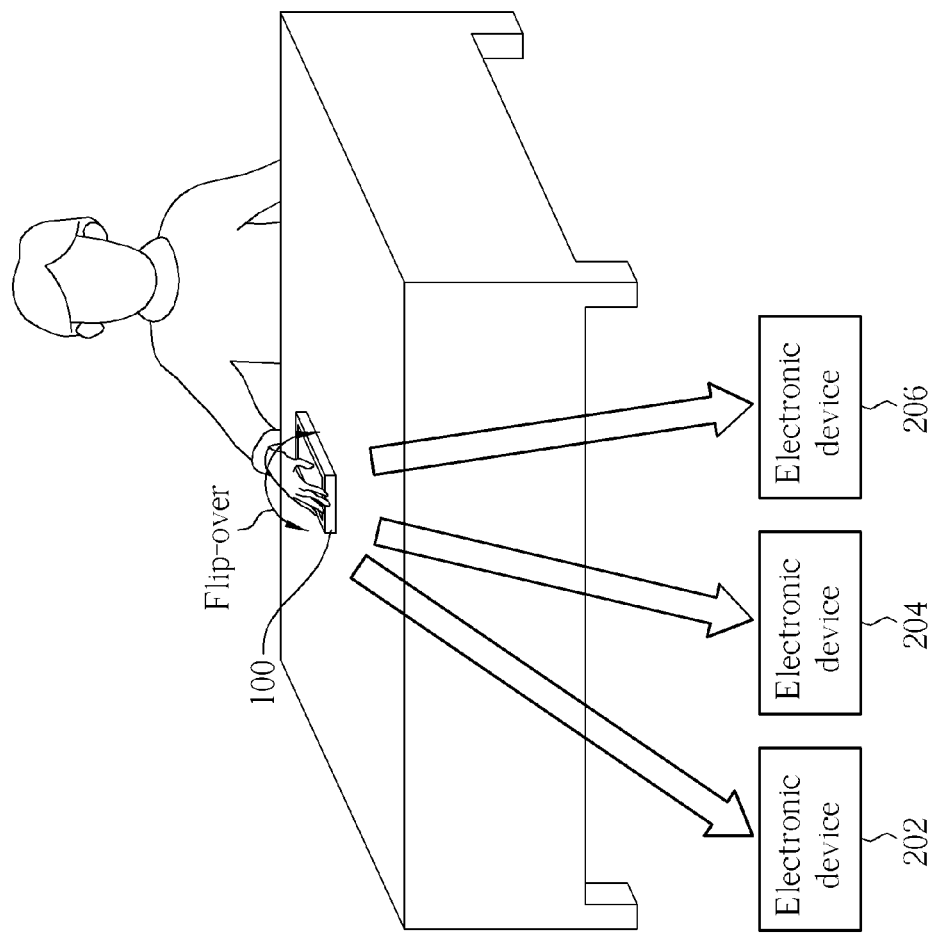
FIG. 1 is a schematic diagram for illustrating device.

Please refer to FIG. 1, which is a schematic diagram for illustrating how a user of a storage device 100 can activate a wireless sharing mode that he or she wants by merely one flip-over on the storage device according to a preferred embodiment of the present invention. The storage device 100 is an apparatus having the function of providing the information stored inside, to share with other electronic devices by a wireless connection. The wireless connection mentioned above includes, but not limit to Wi-Fi, blue-tooth, and Infrared etc. As shown in FIG. 1, the user may change a way of sharing information stored in the storage device 100 with other external electronic devices 202, 204, or 206 by initiating a single flip-over, where the external electronic devices 102, 104, and 106 are assumed to be acknowledged or authorized by the storage device 100 to link said storage device 100 in advance. Therefore, for example, it is beneficial for a user who is in charge of a meeting since the user may instantly share any information in the middle of the meeting.

The way of sharing information, i.e. the wireless sharing mode, may be implemented by pairs, such as enabling/disabling link to the storage device 100, increasing/decreasing a maximal number of other electronic devices allowed to link the storage device, raising/lowering priority of another electronic device to link the storage device, or broadening/narrowing a maximal bandwidth of linking to the storage device, according to embodiments of the present invention.

Figure 2:
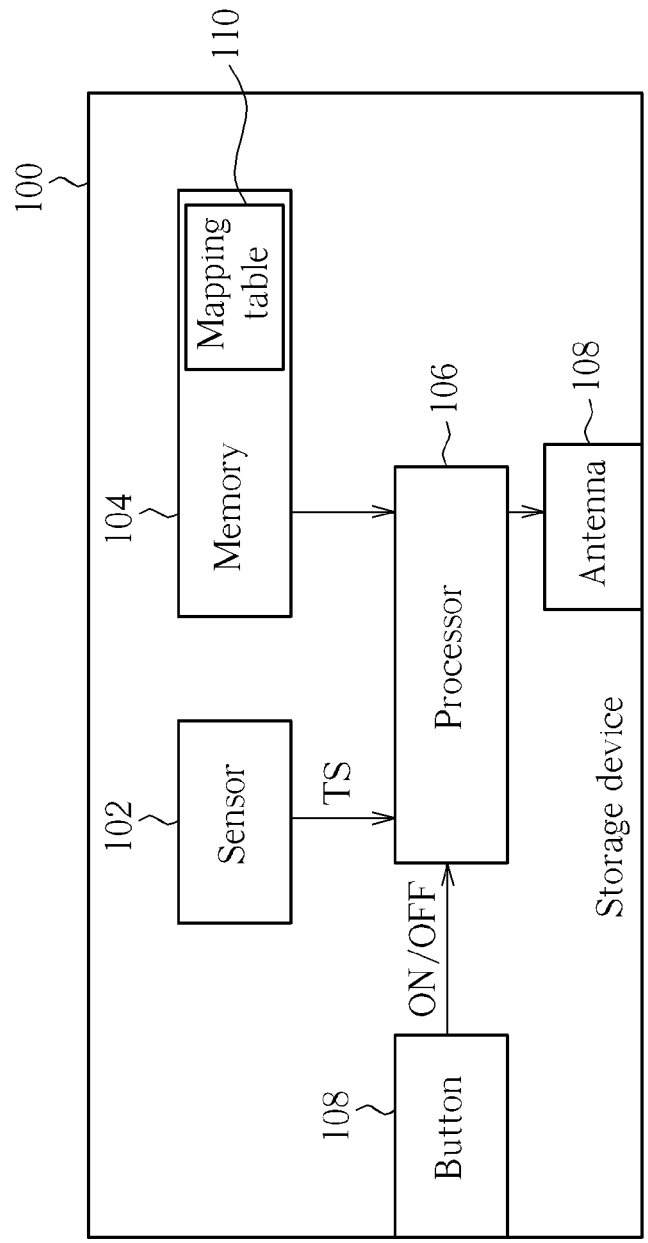
FIG. 2 illustrates the storage device for determining a wireless sharing mode according to one embodiment of the present invention.

Please refer to FIG. 2, which illustrates the storage device 100 for determining a wireless sharing mode according to one embodiment of the present invention. As shown in FIG. 2, the storage device 100 includes a sensor 102, a memory 104, a processor 106, and an antenna 108.

The sensor 102 is configured to actively sense whether the storage device 100 is flipped over and to generate a predetermined trigger signal TS after sensing occurrence of a flip-over on the storage device 100, where the predetermined trigger signal TS is utilized for switch a wireless sharing mode of the storage device 100. In some embodiments of the present invention, the sensor 102 is implemented by a gravity sensor (G-sensor) or a light sensor for actively sensing whether the storage device 100 is flipped over.

The memory 104 is utilized for storing a plurality of wireless sharing modes, i.e. the above-mentioned ways of sharing information.

The processor 106 is utilized for switching the storage device 100 into a predetermined wireless sharing mode according to currently-set wireless sharing modes defined by the memory 104 in response to the predetermined signal TS after the processor 106 receives the predetermined trigger signal TS from the sensor 102. Note that in some embodiments of the present invention, a pair of wireless sharing modes are utilized by the processor 106 at a time so that the storage device 100 is switched between the pair of wireless sharing modes while being flipped-over.

In some embodiments of the present invention, a first side of the storage device 100 may be specifically assigned to a first wireless sharing mode among the pair, and a second side of the storage device 100 may be specifically assigned to a second wireless sharing mode among the pair. Therefore, when the sensor 102 senses that the first side of the storage device 100 is faced-up, the processor 106 will automatically keep the storage device 100 at the first wireless sharing mode until a flip-over causes the second side of the storage device 100 to be faced-up. Similarly, when the sensor 102 senses that the second side of the storage device 100 is faced-up, the processor 106 will automatically keep the storage device 100 at the second wireless sharing mode until a flip-over causes the first side of the storage device 100 to be faced-up.

In other embodiments of the present invention, when one side of the storage device 100 is faced-down, the wireless sharing mode of the storage device 100 may also be switched. It indicates the fact that a faced-up/down status of the storage device 100 for triggering the switching of its wireless sharing modes may be optional or alternative for both the first and second wireless sharing modes, in embodiments of the present invention.

The antenna 108 is configured to transmit information to be shared from the processor 206 to other wireless electronic devices, for example, the electronic devices 202, 204, or 206.

How the storage device 100 is operated for switching wireless sharing modes will be described in the following exemplary embodiments of the present invention.

In a first embodiment of the present invention, the processor 106 sets enabling/disabling link to the storage device 100 as its pair of wireless sharing modes, and may assign disabling (i.e. switching off) link to the storage device 100 as its default wireless sharing mode.

When the user of the storage device 100 flips the storage device 100 over as an intension of sharing information with other electronic devices, the sensor 102 senses the occurrence of the flip-over, and then the processor 106 switches the storage device 100 from disabling the wireless sharing mode to enabling the wireless sharing mode for sharing the information with the other electronic devices. Later, when the user flips the storage device 100 once again, the processor 106 switches the storage device 100 from enabling the wireless sharing mode to disabling the wireless sharing mode.

In a second embodiment of the present invention, the processor 106 sets a first maximal number of other electronic devices allowed to simultaneously link the storage device 100 as a first wireless sharing mode, and sets a second maximal number of electronic devices allowed to simultaneously link the storage device 100 as a second wireless sharing mode, where the first maximal number is larger than the second maximal number, and both the first and second maximal numbers can be updated or predetermined by the user of the storage device 100 by giving commands to the processor 106. The second wireless sharing mode may be assumed as its default wireless sharing mode. Note that the maximal number of electronic devices may indicate a maximal number of MAC addresses or access points allowed to link with the storage device 100 simultaneously.

When the user of the storage device 100 flips the storage device 100 over, the sensor 102 senses the occurrence of the flip-over, and then the processor 106 switches the storage device 100 from the second wireless sharing mode to the first wireless sharing mode, so that a larger maximal number of electronic devices can be simultaneously allowed to link the storage device 100, i.e. more people can be simultaneously allowed to access the storage device 100. Later, when the user flips the storage device 100 once again, the processor 106 switches the storage device 100 from the first wireless sharing mode to the second wireless sharing mode, so that a smaller maximal number of electronic devices can be simultaneously allowed to link the storage device 100, i.e. less people can be simultaneously allowed to access the storage device 100, and some people previously allowed to access the storage device 100 may be discarded under this condition.

In a third embodiment of the present invention, the processor 106 sets raising priority of one (or at least one) other electronic devices in linking the storage device 100 as a first wireless sharing mode, and sets lowering priority of the same electronic devices in linking the storage device 100 as a second wireless sharing mode. The second wireless sharing mode may be assumed as a default wireless sharing mode.

When the user of the storage device 100 flips the storage device 100 over, the sensor 102 senses the occurrence of the flip-over, and then the processor 106 switches the storage device 100 from the second wireless sharing mode to the first wireless sharing mode, so that an external electronic device is granted to link the storage device 100 with a high class of priority, i.e. allowed to link more resources in the storage device 100. Later, when the user flips the storage device 100 once again, the processor 106 switches the storage device 100 from the first wireless sharing mode to the second wireless sharing mode, so that the external electronic device is granted to link the storage device 100 with a low class of priority, i.e. allowed to link less resources in the storage device 100.

In a fourth embodiment of the present invention, when the storage device 100 applies Wi-Fi, the processor 106 sets broadening a maximal bandwidth for other electronic devices to link the storage device 100 as a first wireless sharing mode, and sets narrowing the maximal bandwidth for other electronic devices to link the storage device 100 as a second wireless sharing mode. The second wireless sharing mode may be assumed as a default wireless sharing mode.

When the user of the storage device 100 flips the storage device 100 over, the sensor 102 senses the occurrence of the flip-over, and then the processor 106 switches the storage device 100 from the second wireless sharing mode to the first wireless sharing mode, so that the maximal bandwidth of linking the storage device 100 can be broadened, i.e. everyone who is allowed to link the storage device 100 may acquire a broader bandwidth this time. Later, when the user flips the storage device 100 once again, the processor 106 switches the storage device 100 from the first wireless sharing mode to the second wireless sharing mode, so that the maximal bandwidth of lining the storage device 100 can be narrowed, i.e. everyone who is allowed to link the storage device 100 may acquire a narrower bandwidth this time. Therefore, the user of the storage device 100 may always acquire a maximal available bandwidth whenever he or she needs.

As can be observed from the above-mentioned embodiments, the storage device 100 will easily fulfill dual-mode sharing without complex manipulations from the user of the storage device 100. It also saves the inconvenience and trouble of the user from entering a password or requesting for authentication by simply sensing a flip-over.

In one embodiment of the present invention, utilizing which pair of wireless sharing modes, i.e. enabling/disabling, increasing/decreasing the maximal number, raising/lowering priority, or broadening/narrowing bandwidth, may also be set in advance or be updated whenever the user of the storage device 100 intends to. For example, all the pairs of wireless sharing modes can be stored in the memory 104, and the storage device 100 is configured to provide a mechanism of choosing which pair of wireless sharing modes to the user, so that the user is allowed to change the utilized pair of wireless sharing modes by simply setting the storage device 100 whenever he or she intends to. Note that the mechanism of choosing may be implemented by a hardware selector disposed on the storage device 100 or an application program installed in the storage device 100 and run by the processor 106 in some embodiments of the present invention. The flip-over will trigger a transition between the set pair of wireless sharing modes.

Please refer to FIG. 3, which illustrates a mapping table 110 stored in the memory 104 shown in FIG. 2 according to one embodiment of the present invention. As can be observed in FIG. 3, the mapping table 110 provides four pairs of candidate wireless sharing modes, and only one of them can be chosen at a time, i.e. the mapping table 110 is merely configured to provide exclusive options, where only raising/lowering priority is chosen in response to the flip-over in the case shown in FIG. 3. With the aid of the mapping table shown in FIG. 2 and FIG. 3, the user is allowed to choose the pair of wireless sharing modes that he or she needs, in response to various kinds of conditions.

In one embodiment of the present invention, there may be an additional button 108 disposed on the storage device 100 for foolproof usage. The button 108 is configured to activate the wireless sharing mode switching of the processor 106 only when said button 108 is pressed in addition to the occurrence of the flip-over on the storage device 100. It indicates that even if the sensor 102 senses the occurrence of the flip-over on the storage device 100, as long as the button 108 is not pressed, the switching of the utilized wireless sharing mode on the storage device 100 will not be activated. It can be inducted that the button 108 is utilized for preventing wrongly switching of the wireless sharing mode by accidental or wrong flip-over on the storage device 100. In an other embodiment of the present invention, the foolproof function of the button 108 may also be implemented as an option provided by the storage device 100, for example, applying built-in software to switch on/off the function of sensing the occurrence of the flip-over.

Figure 4:
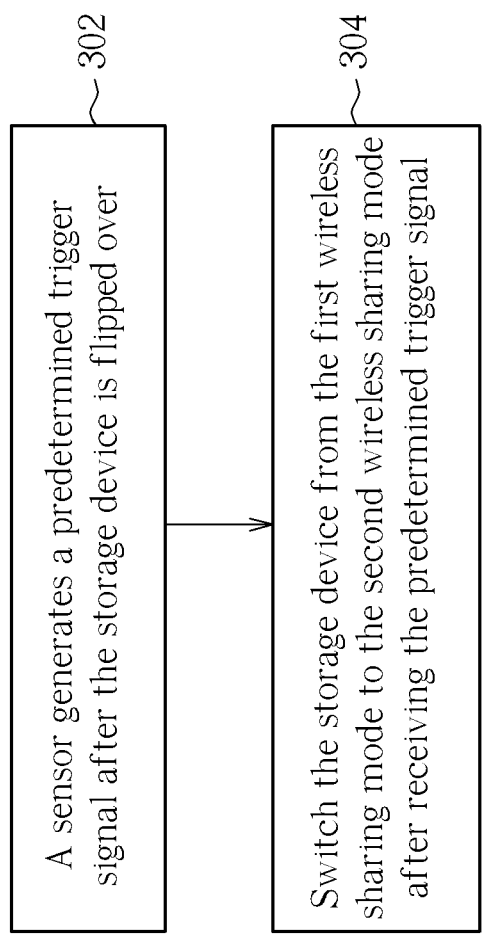
FIG. 4 illustrates a flowchart of a method of controlling a storage device to switch its wireless sharing mode according to the above-mentioned embodiments of the present invention.

Please refer to FIG. 4, which illustrates a flowchart of a method of controlling a storage device to switch its wireless sharing mode according to the above-mentioned embodiments of the present invention. The method includes steps as follows:

Step 302: A sensor generates a predetermined trigger signal after the storage device is flipped over.

Step 304: Switch the storage device from a first wireless sharing mode to a second wireless sharing mode after receiving the predetermined trigger signal.

Figure 5:
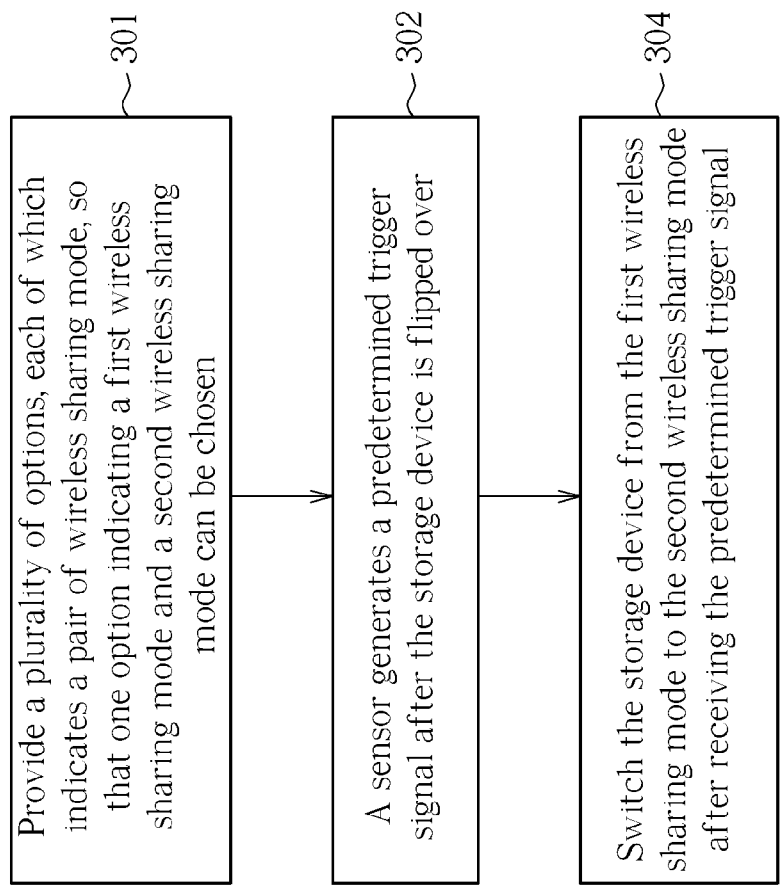
FIG. 5 illustrates a flowchart of a method of controlling a storage device to switch its wireless sharing mode and to choose which pair of wireless sharing modes to activate according to embodiments of the present invention.

Please also refer to FIG. 5, which also illustrates a flowchart of a method of controlling a storage device to switch its wireless sharing mode and to choose which pair of wireless sharing modes to activate according to the above-mentioned embodiments of the present invention. The related steps are listed as follows:

Step 301: Provide a plurality of options, each of which indicates a pair of wireless sharing mode, so that one option indicating a first wireless sharing mode and a second wireless sharing mode can be chosen.

Step 302: A sensor generates a predetermined trigger signal after the storage device is flipped over.

Step 304: Switch the storage device from the first wireless sharing mode to the second wireless sharing mode after receiving the predetermined trigger signal.

Step 301 may be implemented with the aid of the mapping table 110. Note that embodiments formed by reasonable combinations or permutations of steps in FIG. 4 or FIG. 5 or by adding above-mentioned limitations to steps shown in FIG. 4 or FIG. 5 should also be regarded as embodiments of the present invention.

A method of controlling a storage device to switch its wireless sharing mode and the storage device are disclosed in the present invention for providing an intuitive way to share information from the storage device, by a simple flip-over of the user on the storage device, so as to bring convenience for the user.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of controlling a storage device, comprising:
generating a predetermined trigger signal while the storage device is flipped over; and
switching the storage device between a first wireless sharing mode and a second wireless sharing mode in response to the predetermined trigger signal.

2. The method of claim 1 wherein before the step of generating the predetermined trigger signal further comprises a step of pressing a button to enable a sensor to sense a flip-over of the storage device.

3. The method of claim 1 wherein the first wireless sharing mode allows a number of simultaneous external link with the storage device while the second wireless sharing mode allows none of external link with the storage device.

4. The method of claim 1 wherein the first wireless sharing mode allows a first class of priority of linking the storage device, the second wireless sharing mode allows a second class of priority of linking the storage device, and the first class of priority of linking the storage device is higher than the second class of priority.

5. The method of claim 1 wherein the first wireless sharing mode allows a first maximal number of simultaneous external links with the storage device, the second wireless sharing mode allows a second maximal number of simultaneous external links with the storage device, and the first maximal number is larger than the second maximal number.

6. The method of claim 5 wherein the first maximal number and the second maximal number of simultaneous external links indicates different maximal numbers of MAC addresses allowed to link with the storage device simultaneously.

7. The method of claim 5 wherein the first maximal number and the second maximal number can be updated or predetermined according to a given command to the storage device.

8. The method of claim 1 wherein the first wireless sharing mode allows a first maximal bandwidth of linking the storage device, the second wireless sharing mode allows a second maximal bandwidth, and the first maximal bandwidth is broader than the second maximal bandwidth.

9. The method of claim 1 further comprising:
providing a plurality of pairs of wireless sharing modes so that one pair of the plurality of pairs of wireless sharing modes can be chosen;
wherein the chosen pair plurality of wireless modes comprises the first wireless sharing mode and the second wireless sharing mode.

10. The method of claim 9 wherein providing the plurality of wireless sharing modes so that the pair of the plurality of pairs of wireless sharing modes can be chosen comprises:
providing the plurality of wireless sharing modes stored in a mapping table; and
providing a function of choosing the pair of wireless sharing modes by using a hardware selector or an application program installed in the storage device.

11. A storage device comprising:
a sensor for generating a predetermined trigger signal while sensing that the storage device is flipped over;
a memory for storing a first wireless sharing mode and a second wireless sharing mode;
a processor for switching the storage device from the first wireless sharing mode to the second wireless sharing mode in response to the predetermined trigger signal; and
an antenna for transmitting information of the storage device in a wireless manner.

12. The storage device of claim 11 wherein the sensor is configured to generate the predetermined trigger signal after the storage device is flipped over while a predetermined button of the storage device is pressed.

13. The storage device of claim 11 further comprising a means for enabling the sensor to generate the predetermined trigger signal.

14. The storage device of claim 11 wherein the first wireless sharing mode allows a number of simultaneous external link with the storage device while the second wireless sharing mode allows none of external link with the storage device.

15. The storage device of claim 11 wherein the first wireless sharing mode allows a first class of priority of linking the storage device, the second wireless sharing mode allows a second class of priority of linking the storage device, and the first class of priority of linking the storage device is higher than the second class of priority.

16. The storage device of claim 11 wherein the first wireless sharing mode allows a first maximal number of simultaneous external links with the storage device, the second wireless sharing mode allows a second maximal number of simultaneous external links with the storage device, and the first maximal number is larger than the second maximal number.

17. The storage device of claim 16 wherein the first maximal number and the second maximal number of simultaneous external links indicates different maximal numbers of MAC addresses allowed to link with the storage device simultaneously.

18. The storage device of claim 16 wherein the first maximal number and the second maximal number can be updated or predetermined according to a given command to the storage device.

19. The storage device of claim 11 further comprising:
a selector for choosing one pair of a plurality of pairs of wireless sharing modes stored in the memory;
wherein the chosen pair plurality of wireless modes comprises the first wireless sharing mode and the second wireless sharing mode.

20. The storage device of claim 11 wherein the processor is further configured to run an application program for choosing one pair of a plurality of pairs of wireless sharing modes stored in the memory; and
wherein the chosen pair plurality of wireless modes comprises the first wireless sharing mode and the second wireless sharing mode.

21. A method of controlling a storage device, comprising:
generating a predetermined trigger signal for indicating a faced-up/down status of the storage device; and
switching the storage device to a first wireless sharing mode or a second wireless sharing mode according to the predetermined trigger signal.

22. A storage device comprising:
a sensor for generating a predetermined trigger signal for indicating a faced-up/down status of the storage device;
a memory for storing a first wireless sharing mode and a second wireless sharing mode;
a processor for switching the storage device to a first wireless sharing mode or a second wireless sharing mode according to the predetermined trigger signal; and
an antenna for transmitting information of the storage device in a wireless manner.

* * * * *